(12) United States Patent
Schlaeffer et al.

(10) Patent No.: US 12,169,570 B2
(45) Date of Patent: Dec. 17, 2024

(54) DATA PROCESSING DEVICE AND METHOD FOR PROCESSING SECRET DATA

(71) Applicant: Infineon Technologies AG, Neubiberg (DE)

(72) Inventors: Martin Schlaeffer, Munich (DE); Osama Amin, Munich (DE); Elif Bilge Kavun, Munich (DE)

(73) Assignee: Infineon Technologies AG, Neubiberg (DE)

( * ) Notice: Subject to any disclaimer, the term of this patent is extended or adjusted under 35 U.S.C. 154(b) by 325 days.

(21) Appl. No.: 17/574,779

(22) Filed: Jan. 13, 2022

(65) Prior Publication Data
US 2022/0237304 A1   Jul. 28, 2022

(30) Foreign Application Priority Data

Jan. 26, 2021  (DE) .......................... 102021101697.5

(51) Int. Cl.
| | |
|---|---|
| *G06F 21/60* | (2013.01) |
| *G06F 7/58* | (2006.01) |
| *G06F 21/64* | (2013.01) |
| *G06F 21/79* | (2013.01) |
| *G11C 7/10* | (2006.01) |
| *G06F 21/10* | (2013.01) |

(52) U.S. Cl.
CPC ............ *G06F 21/602* (2013.01); *G06F 7/588* (2013.01); *G06F 21/64* (2013.01); *G06F 21/79* (2013.01); *G11C 7/1009* (2013.01); *G06F 21/107* (2023.08)

(58) Field of Classification Search
None
See application file for complete search history.

(56) References Cited

U.S. PATENT DOCUMENTS 11,777,715 B2 * 10/2023 Khandani ............... H04L 69/16
                                                           713/168
2002/0002671 A1  1/2002  Symes
2011/0261958 A1  10/2011 Gebotys
(Continued)

FOREIGN PATENT DOCUMENTS

EP      3664359 A1 *  6/2020    ........... H04L 9/0618
GB      2362731 A      11/2001

OTHER PUBLICATIONS

EP3664359A1 (Year: 2020).*
(Continued)

*Primary Examiner* — Brandon Hoffman
(74) *Attorney, Agent, or Firm* — Murphy, Bilak & Homiller, PLLC

(57) ABSTRACT

According to various embodiments, a data processing device is described comprising a memory configured to store data words in the form of at least two respective shares, a logic circuit configured to receive the at least two shares of at least one of the data words and to process the shares to generate at least two shares of a result data word, a remasking circuit configured to receive at least two shares of at least one of the data words and refresh the shares and an output circuit configured to store the at least two shares of the result data word or to store the refreshed at least two shares depending on a control sequence specifying a sequence of real operations and dummy operations.

20 Claims, 4 Drawing Sheets

(56) References Cited

U.S. PATENT DOCUMENTS

| | | | | |
|---|---|---|---|---|
| 2019/0371210 A1* | 12/2019 | Rau | ............... | G06F 7/729 |
| 2020/0396068 A1* | 12/2020 | Sarno | ............... | H04L 9/0894 |
| 2021/0240861 A1* | 8/2021 | Mendel | ............... | G06F 21/602 |
| 2021/0367766 A1* | 11/2021 | De Hoogh | ............... | H04L 9/0894 |

OTHER PUBLICATIONS

Chen, Cong, et al., "A Tale of Two Shares: Why Two-Share Threshold Implementation Seems Worthwhile - and Why it is not", Worcester Polytechnic Institute, 2016, 1-26.

* cited by examiner

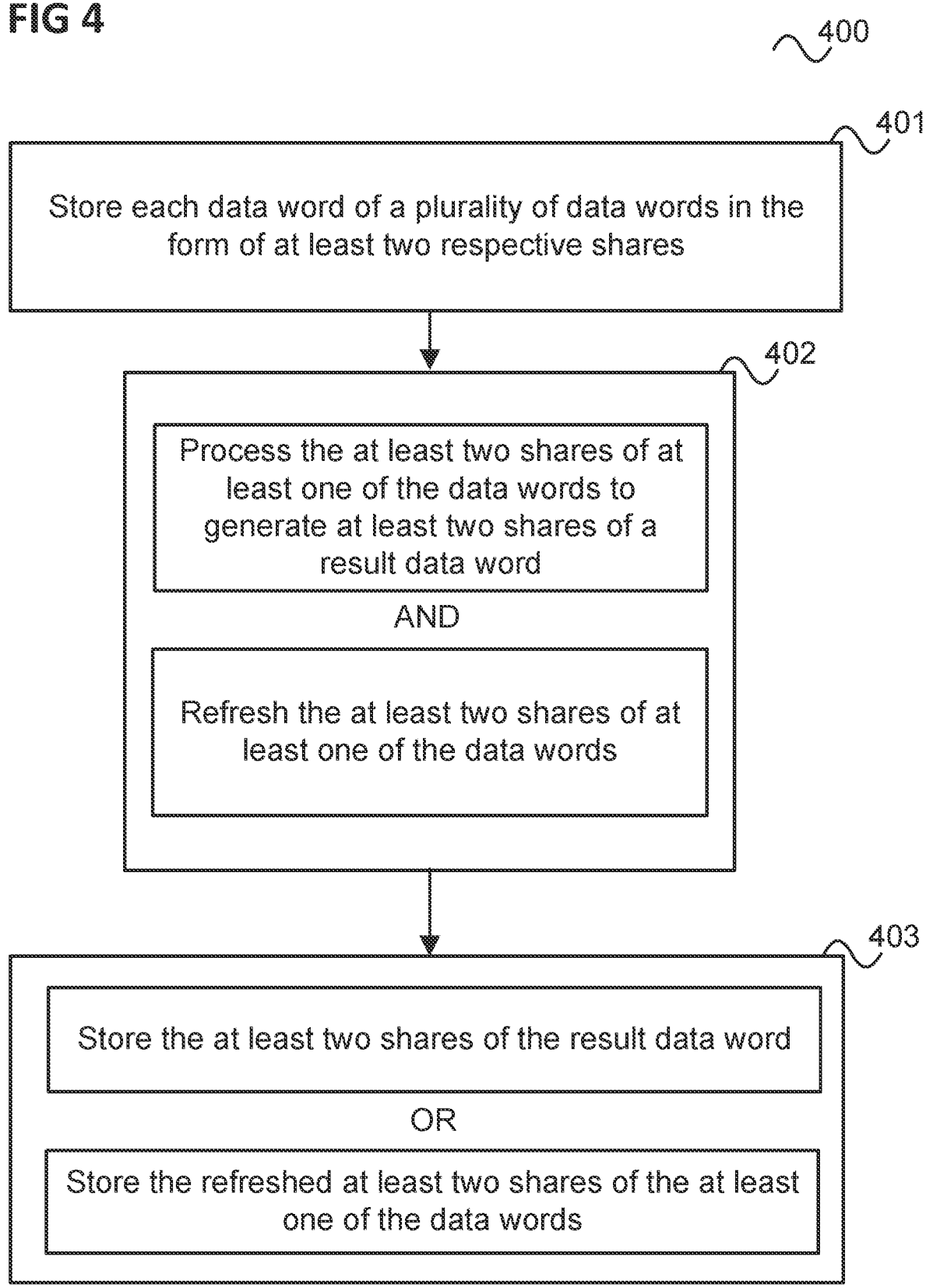

DATA PROCESSING DEVICE AND METHOD FOR PROCESSING SECRET DATA

TECHNICAL FIELD

The present disclosure relates to data processing devices and methods for processing secret data.

BACKGROUND

Electronic devices that process secure data, such as cryptographic keys, should be protected against attacks like fault attacks and side-channel analysis. One approach to counter attacks is the introduction of dummy calculations into a processing flow. However, implementing dummy calculations has several challenges, such as that they need to have the same behavior as real operations (i.e., non-dummy operations). In addition, dummy data to be processed in dummy operations needs to be provided and storing dummy operation results introduces additional memory overhead. Therefore, efficient approaches to implement dummy operations in a security context are desirable.

SUMMARY

According to various embodiments of the techniques, apparatuses and systems described herein, a data processing device is provided, where the data processing device includes a memory configured to store each data word of a plurality of data words in the form of at least two respective shares, a logic circuit configured to receive the at least two shares of at least one of the data words and to process the at least two shares to generate at least two shares of a result data word, a remasking circuit configured to receive the at least two shares of at least one of the data words and refresh the at least two shares, and an output circuit configured to store the at least two shares of the result data word or to store the refreshed at least two shares, depending on a predetermined control sequence specifying a sequence of real operations and dummy operations.

According to a various other embodiments, a corresponding method for processing data.

BRIEF DESCRIPTION OF THE FIGURES

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which:

FIG. 4 shows a flow diagram illustrating a method for processing (at least partially secret) data according to an embodiment.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The embodiments described herein can be realized by a processing device like a personal computer, microcontroller, smart card (of any form factor), secure microcontroller, hardware root of trust, (embedded) secure element (ESE), Trusted Platform Module (TPM), or Hardware Security Module (HSM).

Figure 1:
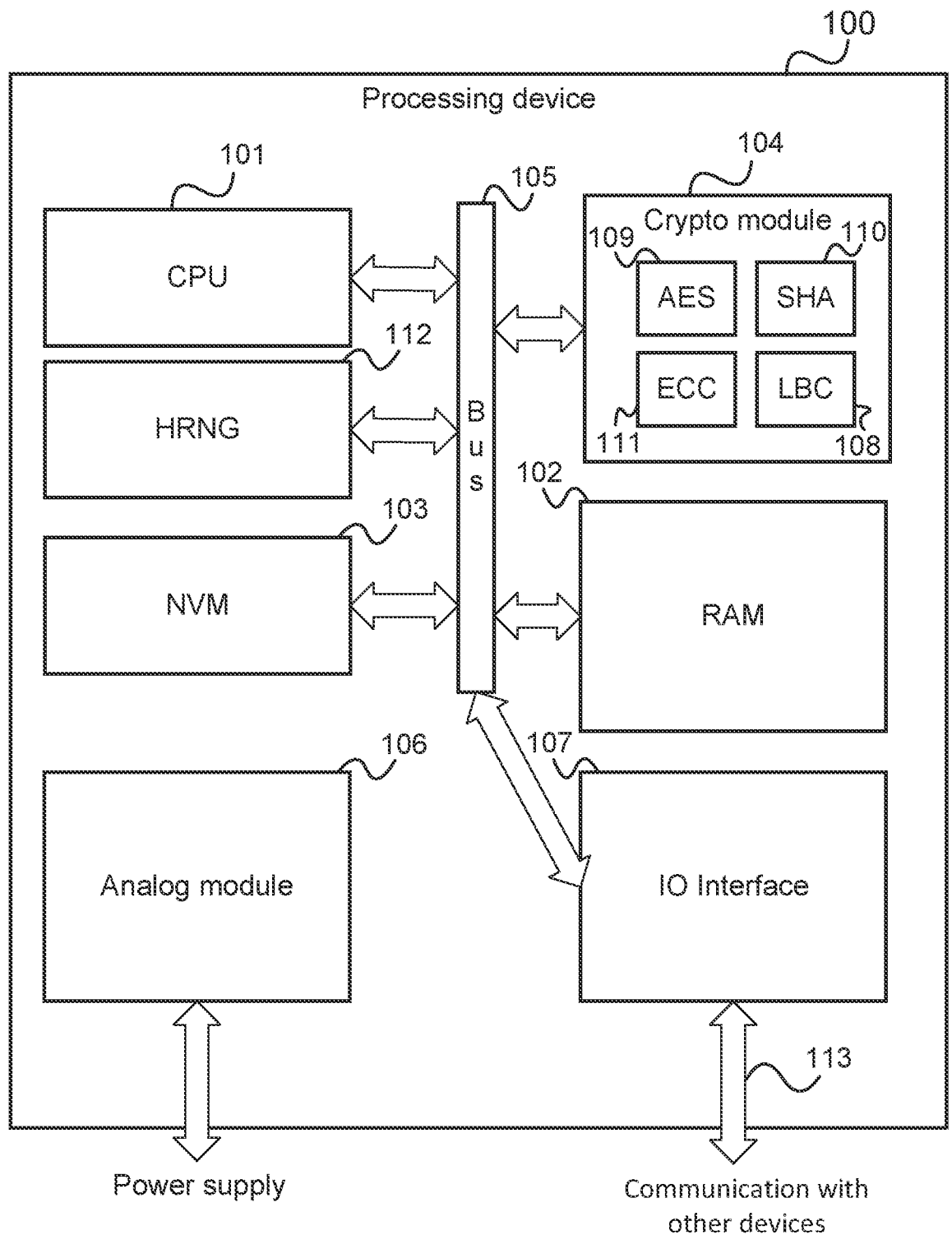
FIG. 1 shows an example for a processing device.

FIG. 1 shows an example for a processing device 100 including a CPU 101, a RAM 102, a non-volatile memory 103 (NVM), a crypto module 104, an analog module 106, an input/output interface 107 and a hardware-random number generator 112.

In this example, the CPU 101 has access to at least one crypto module 104 over a shared bus 105 to which each crypto module 104 is coupled. Each crypto module 104 may in particular include one or more crypto cores to perform certain cryptographic operations. Exemplary crypto cores are:

an AES core 109,
a SHA core 110,
an ECC core 111, and
a lattice-based crypto (LBC) core 108.

The lattice-based crypto core 108 may be provided in order to accelerate lattice-based cryptography.

The CPU 101, the hardware random number generator 112, the NVM 103, the crypto module 104, the RAM 102 and the input/output interface 107 are connected to the bus 105. The input output interface 107 may have a connection 113 to other devices, which may be similar to the processing device 100.

The analog module 106 is supplied with electrical power via an electrical contact and/or via an electromagnetic field. This power is supplied to drive the circuitry of the processing device 100 and may in particular allow the input/output interface to initiate and/or maintain connections to other devices via the connection 113.

The bus 105 itself may be masked or plain. Instructions for carrying out the processing and algorithms described in the following may in particular be stored in the NVM 103 and processed by the CPU 105. The data processed may be stored in the NVM 103 or in the RAM 102. Supporting functions may be provided by the crypto modules 104 (e.g., expansion of pseudo random data). Random numbers are supplied by the hardware-random number generator 112.

To perform the procedures described in the following, instructions may be stored in the crypto module 104 or they may be provided by the CPU 101 via the bus 105. Data may be stored locally within the crypto module 104. It is also an option that the data is temporarily stored in the RAM 102 or the NVM 103.

The processing and algorithms described in the following may be exclusively or at least partially conducted on the crypto module 104 or on the CPU 101. A processing circuit (such as crypto module 104 or CPU 101) may or may not be equipped with hardware-based security features. Such hardware-based security features could be circuits that implement countermeasures against side-channel power analysis or fault injection (e.g., using a laser), to avoid that an attacker gains information about secret data (such as cryptographic keys or secret user data). Such countermeasures may be realized by the use of randomness, redundant hardware, or redundant processing. In general, the goal of countermeasures is to disguise internally processed values from an attacker who is able to observe the physical effect the processing of such values.

Typical concepts for protecting the computation of secret data are randomizing the execution order of operations (hiding), performing dummy operations on dummy data (hiding) and masking data to perform randomized computations.

To avoid that an attacker can distinguish dummy operations from real (i.e., non-dummy) operations, they need to have the same behavior as real operations, in terms of what an attacker can monitor. Therefore, for example, it may not be sufficient that dummy results are computed but not used, i.e., in particular not stored, since an attacker may monitor memory accesses. However, providing dummy memory (i.e., memory used for storing dummy operations results) leads to additional chip area overhead. Moreover, an attacker may even be able to identify monitor memory locations where processing results are stored, so it may not be sufficient to store dummy results in separate, distinct, memory locations since an attacker could then again identify dummy operations. Rather, it is desirable to hide the dummy memory in between and among real memory (i.e., memory used by real operations). Additionally, it is desirable that the processing device detects faults in dummy operations. This is because an attacker may inject faults into an operation and, if an injected fault has no influence on the overall processing, may conclude that the operation is a dummy operation.

The processing described in the following may be performed by a processing circuit like CPU 101 or crypto module 104 (e.g. a crypto core). When reference is made to a memory, this may for example be RAM 102 but also an NVM 103 or processor registers (or a combination of (hem). The memory may store a program (e.g. for performing a cryptographic method) having instructions to perform cryptographic operations (e.g. computations) and stores data in form of data words to be processed.

According to various embodiments, operations (e.g., all operations) are masked. This means that the one or more data words processed by an operation are each split into shares.

For example, an operation calculating a function F operates on a data word a. The input word a may be split into two shares $a_0$ and $a_1$ according to an XOR combination, i.e., $a=a_0\char`^a_1$ (where ^ denotes XOR). The splitting into shares is not limited to XOR. XOR is only an example and, for example, arithmetic (addition)-based masking is also possible. Further, the processing circuit implements the operation such that the output word b=F(a) is also masked, i.e. $b=b_0\char`^b_1$. The data words are, for example, stored in memory in masked form, i.e., the shares are stored (e.g., a is stored as pair of data words $a_0$, $a_1$).

A data word may be remasked. This means that the shares are recomputed. For example, the pair $a_0$, $a_1$ is changed to $a_0'$, $a_1'$ where $a_0\char`^a_1=a_0'\char`^a_1'$. This is referred to as a remasking operation (or computation) and can be done by XOR-combination of $a_0$ and $a_1$ both with a random value (referred to as mask refresh value) r, i.e., $a_0'=a_0\char`^r$ and $a_1'=a_1\char`^r$.

Further, according to various embodiments, the processing circuit uses a randomized execution order for the operation, as far as this is possible. Additionally, the processing circuit introduces dummy phases during which it performs dummy operations (D) in between phases where it performs real operations (R). For example, an operation sequence may be D-D-R-R-D-D.

According to various embodiments, the processing circuit performs both a real operation and a remasking operation (for a data word processed in the real operation) in parallel (e.g., at least partially during the same one or more processor clock cycles). The remasking operation serves as dummy operation and a multiplexer selects between the remasking and the real operation, i.e., selects which processing result is output (and stored in memory). For example, $(b_0[i]\char`^b_a[i])=\text{MUX}((a_0[i]\char`^r, a_1[i]\char`^r), F(a_0[i]\char`^r, a_1[i]\char`^r))$.

Here, i may be a random positive integer to randomize the execution order.

An example is described in more detail in the following.

Figure 2:
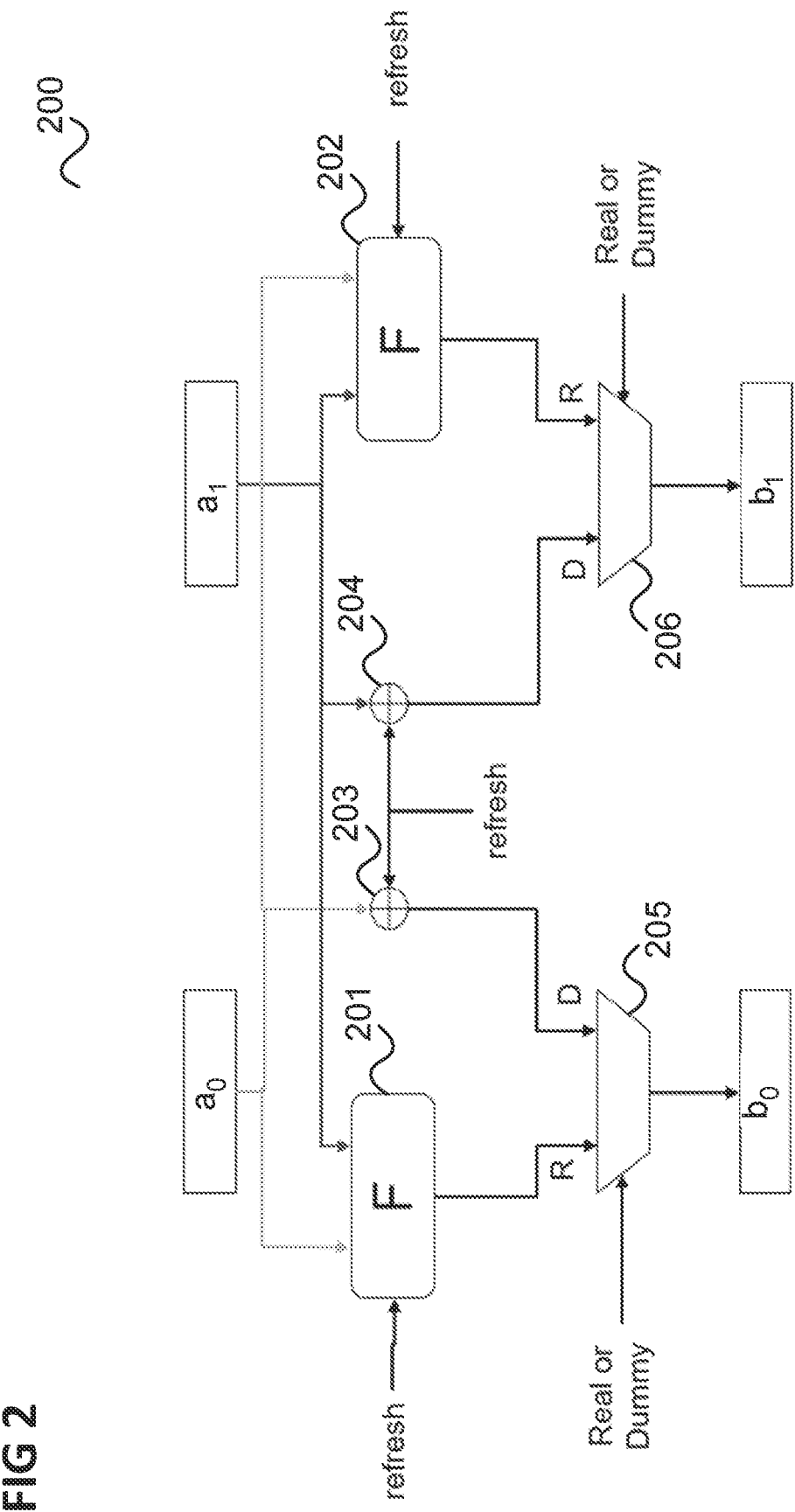
FIG. 2 shows a processing circuit according to an embodiment.

FIG. 2 shows a processing circuit 200 according to an embodiment.

The processing circuit 200 includes several (in this example, two) parallel processing blocks (e.g., circuitry) 201, 202 for calculation of the output value of a function F of an input value.

As above, the input word is denoted as a, (randomly) split into shares $a_0$, $a_1$ and the output word is denoted as h, (randomly) split into shares $b_0$ and $b_1$.

The processing blocks 201, 202 calculate $F(a_0)$ and $F(a_1)$, respectively.

The processing circuit 200 further includes mask refresh circuits 203, 204. The mask refresh circuits 203, 204 receive a mask refresh value r and compute $a_0'=a_0\char`^r$ and $a_1'=a_1\char`^r$, respectively.

A first multiplexer 205 receives the outputs of the first processing block 201 and the first masking circuit 203. It receives a control value which indicates whether a real operation should be carried out (i.e., $F(a_0)$ should be output) or a dummy operation should be carried out (i.e. $a_0'$ should be output). Accordingly, the first multiplexer 205 outputs $b_0$ $F(a_0)$ or $b_0=a_0'$ depending on the control value.

Similarly, a second multiplexer 206 receives the outputs of the second processing block 202 and the second masking circuit 204. It receives the control value which indicates whether a real operation should be carried out (i.e. $F(a_1)$ should be output) or a dummy operation should be carried out (i.e., $a_1'$ should be output). Accordingly, the second multiplexer 206 outputs $b_1=F(a_1)$ or $b_1=a_1'$ depending on the control value.

The control value may be a control value of a(random) sequence of control values (i.e., a control sequence). The control sequence thus specifies a sequence of real operations and dummy operations. Together with the value i, the control sequence thus specifies an operation sequence. A resulting operation sequence may for example be

D[2]-D[3]-D[0]-R[3]-R[0]-R[1]-R[2]-D[1].

The processing circuit 200 stores the output shares $b_0$, $b_1$ in memory.

For a real operation $b=F(a)=b_0\char`^b_1=F(a_0)\char`^F(a_1)=F(a_0\char`^a_1)$.

For a dummy operation $b=a_0'\char`^a_a'$.

The output shares $b_0$, $b_1$ may for example be stored in the location of the input shares $a_0$, $a_1$. Thus, in case of a dummy operation, the processing may continue in the usual fashion since the dummy operation has only performed a remasking. Additionally, an attack on the dummy operation will likely change the program behavior since there will likely be a fault in the data word.

The output shares $b_0$, $b_1$ may also be stored in a different memory location. For this, the processing circuit may track the location to ensure that, if the operation was a dummy operation and the operand a should be processed in a later operation, the remasked operand a is read from memory.

It should be noted that F may (optionally) include a remasking, i.e., the processing blocks 201, 202 may each receive the mask refresh value and the function F may depend on the mask refresh value.

A function F may also have two input operands. In that case, the remasking circuits 203, 204 operate on the operand in the location of which the result is stored. For example, if b=F (a, c) and b is stored in the memory location of a, the remasking circuit 203, 204 perform a remasking of a and c is left unchanged. An operation may also process multiple data words at the same time such that (b, d)=(F(a), F(c)). This may be implemented by having two parallel processing circuits as illustrated in FIG. 2.

Another possibility is that a first data word a is processed to a result data word, e.g., b=F(a), for a real computation, and a second data word c is remarked, i.e., b=remask(c) for a dummy computation. For the real computation, b may be stored at the memory location of a, and for the dummy computation, b is stored at the memory location of c.

Further, multiple operations may be concatenated, for example to process multiple data words (e.g., in case a key needs to be processed which has multiple data words). For such a sequence of operations it may then be controlled by the control sequence whether to perform real operations or dummy operations (for the whole sequence). Thus, the data in memory may be kept consistent.

The processing device may keep track of the real operations that have actually been performed to ensure that the whole program is correctly executed. It may further set constraints on the order of the real operations to ensure that the program is correctly executed.

The operation F may for example be an operation of an AES (Advanced Encryption Standard) SubBytes layer. For example, a real operation is the computation of a masked S-box (1 Byte) and the dummy operation is the remasking of 1 Byte. As explained above, in both cases, the result is written to memory.

According to various embodiments, multiple different real operations are used in the manner described above such that there is additionally a hiding by means of different real operations.

For example, in AES SubBytes and MixBytes layer, a first real operation may be the computation of a masked. S-box (1 Byte) and a second operation may be the computation of masked MixColumns (4 Bytes) and the corresponding dummy operations are remasking 1 Byte and remasking a 4 Byte column.

Figure 3:
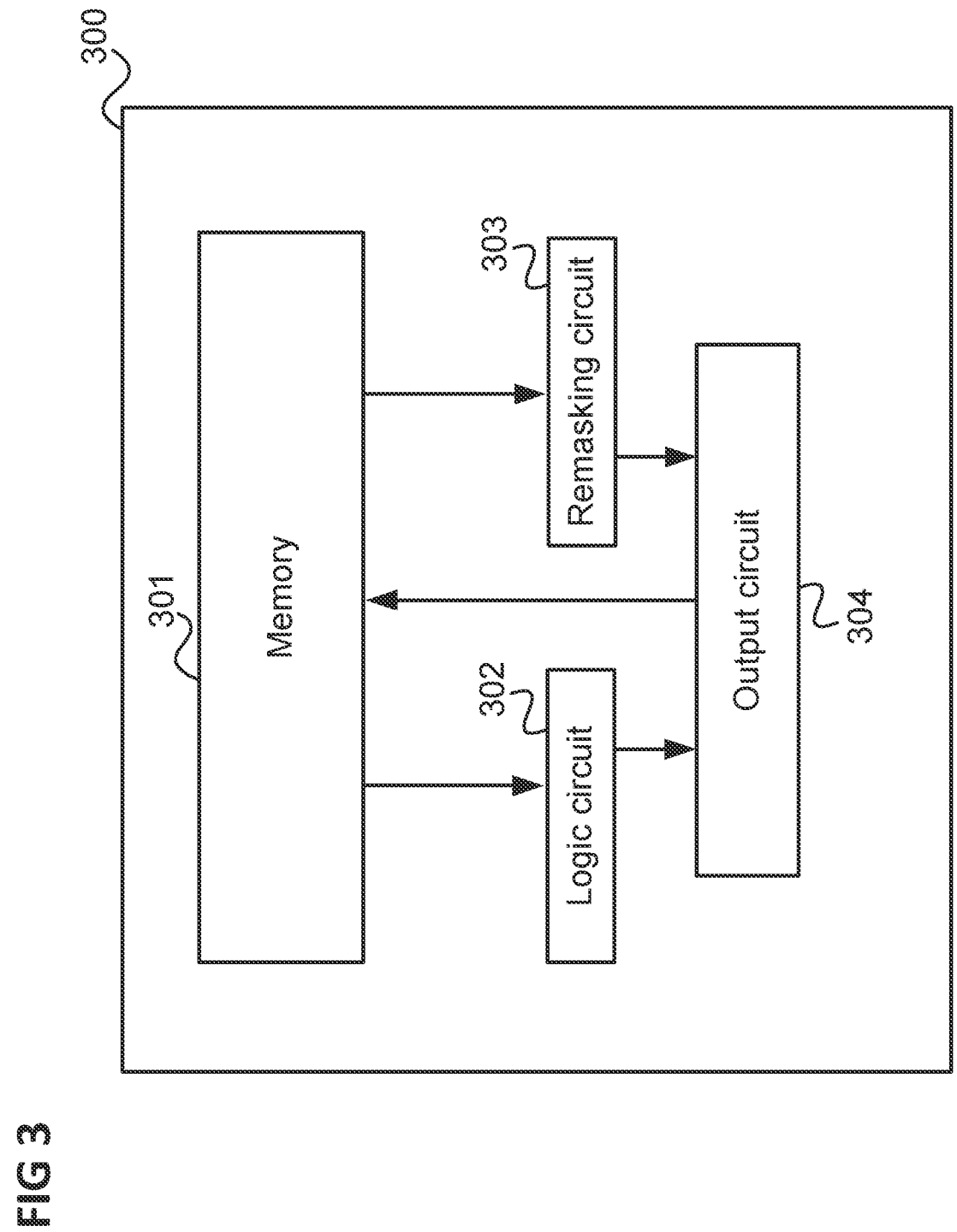
FIG. 3 shows a data processing device according to an embodiment.

In summary, according to various embodiments, a data processing device is provided as illustrated in FIG. 3.

FIG. 3 shows a data processing device 300.

The data processing device 300 includes a memory 301 configured to store each data word of a plurality of data words in the form of at least two respective shares.

Further, the data processing device 300 includes a logic circuit 302 configured to receive the at least two shares of at least one of the data words and to process the at least two shares (i.e., those it has received) to generate at least two shares of a result data word.

The data processing device 300 further includes a remasking circuit 303 configured to receive the at least two shares of at least one of the data words and refresh the at least two shares (i.e. those it has received).

The data processing device 300 further includes an output circuit configured to store the at least two shares of the result data word or to store the refreshed at least two shares depending on a control sequence specifying a sequence of real operations and dummy operations.

The control sequence may or not be predetermined. The sequence of real and dummy operations may in particular be randomized at runtime (i.e., the control sequence may be determined at runtime).

The logic circuit and the remasking circuit may receive the same shares, i.e., the shares of the same data word (or the same one or more data words) and process/refresh those shares. The logic circuit may also receive the shares of more data words than the remasking circuit (e.g., the logic circuit performs an operation with two operands but the remasking circuit only refreshes the shares of one operand).

According to various embodiments, in other words, a processing device performs both a dummy operation and a real operation on each data word and uses (and therefore stores) only the result of either one depending on a random control sequence (i.e., either the result of a dummy operation or a result of a real operation is stored). The dummy operation is a remasking of the respective (real) data word and the remasking result is written back to memory. Thus, the dummy operations operate on the real data and the results of the dummy operations are written back to memory and change the real (i.e., non-dummy) data. So, dummy operations are indistinguishable from real operations in terms of memory accesses.

Thus the approach of FIG. 3 allows protection by means of dummy operations with little area overhead (because there is no need to store extra dummy data) and without the need to include dummy memory hidden in between real memory.

FIG. 4 shows a flowdiagram 400 illustrating a method for processing (at least partially secret) data.

In 401, each data word of a plurality of data words is stored in the form of a two respective shares.

In 402, the at least two shares of at least one of the data words are processed to generate at least two shares of a result data word and the at least two shares of at least one of the data words are refreshed (i.e. the at least one of the data words is remasked).

In 403, (either) the at least two shares of the result data word are stored or the refreshed at least two shares are stored depending on a control sequence specifying a sequence of real operations and dummy operations.

Various Examples are described in the following:

Example 1 is a data processing device as illustrated in FIG. 3.

Example 2 is the data processing device of Example 1, wherein the logic circuit is configured to, for each operation of a sequence of operations, receive the at least two shares of at least one of the data words and to process the at least two shares according to the operation to generate at least two shares of a result data word, the remasking circuit is configured to receive the at least two shares of at least one of the data words and refresh the at least two shares and the output circuit is configured to store the at least two shares of the result data word or to store the refreshed at least two shares depending on the control sequence.

Example 3 is the data processing device of Example 2, wherein at least some operations of the sequence of operations are non-dummy operations.

Example 4 is the data processing device of Example 2 or 3, wherein the control sequence specifies, for each operation of the sequence of operations, whether a real operation or a dummy operation is to be carried out.

Example 5 is the data processing device of Example 4, wherein the operations for which the control sequence specifies that a real operation is to be carried out are non-dummy operations.

Example 6 is the data processing device of any one of Examples 2 to 5, including a control circuit configured to set an order of the sequence of operations.

Example 7 is the data processing device of Example 6, including a random number generator wherein the control circuit is configured to set the order of the sequence of operations based on one or more random numbers provided by the random number generator.

Example 8 is the data processing device of any one of Examples 1 to 7, wherein the control sequence includes a control value for each operation of a sequence of operations and the output circuit is configured to store the at least two shares of the result data word or to store the refreshed at least two shares depending on the control value the control sequence includes for an operation according to which the logic circuit has processed the at least two shares.

Example 9 is the data processing device of any one of Examples 1 to 8, wherein the data processing device is configured to discard the at least two shares of the result data word if the control sequence specifies for the operation that a dummy operation is to be carried out.

Example 10 is the data processing device of any one of Examples 1 to 9, wherein the data processing device is configured to discard the refreshed at least two shares if the control sequence specifies for the operation that a real operation is to be carried out.

Example 11 is the data processing device of any one of Examples 1 to 10, wherein the sequence of operations for which the control sequence specifies that a real operation is to be carried out implements a cryptographic processing of data represented by the plurality of data words.

Example 12 is the data processing device of Example 11, wherein the cryptographic processing is a decryption, an encryption, a signing or a key generation.

Example 13 is the data processing device of any one of Examples 1 to 12, including a random number generator and a control sequence generation circuit configured to generate the control sequence based on one or more random numbers provided by the random number generator.

Example 14 is the data processing device of any one of Examples 1 to 13, wherein the remasking circuit is configured to receive a mask refresh value and is configured to refresh the at least two shares depending on the mask refresh value.

Example 15 is the data processing device of any one of Examples 1 to 14, wherein the logic circuit is configured to receive a mask refresh value and is configured to perform the processing of the at least two shares depending on the mask refresh value.

Example 16 is the data processing device of any one of Examples 1 to 15, wherein the logic circuit is configured to process the at least two shares according to a non-dummy operation to generate the at least two shares of the result data word.

Example 17 is the data processing device of any one of Examples 1 to 16, wherein the logic circuit is configured to process the at least two shares to generate the at least two shares of the result data word according to an operation going beyond or differing from a remasking.

Example 18 is the data processing device of any one of Examples 1 to 17, wherein the data includes secret data.

Example 19 is the data processing device of any one of Examples 1 to 18, wherein the data includes one or more cryptographic keys.

Example 20 is the data processing device of any one of Examples 1 to 19, including an input interface configured to receive the plurality of data words and including a masking circuit configured to split each data word of the plurality of data words into at least two respective shares and to store the shares into the memory.

Example 21 is the data processing device of any one of Examples 1 to 20, wherein the memory includes a random-access memory, one or more processor registers, a non-volatile memory or a combination thereof.

Example 22 is the data processing device of any one of Examples 1 to 21, wherein the output circuit includes a plurality of multiplexers, wherein each multiplexer is configured to receive one of the at least two shares of the result data word and to receive a refreshed share and to output the share of the result data word or the refreshed share depending on the control sequence.

Example 23 is the data processing device of any one of Examples 1 to 22, wherein the at least two shares are two shares and refreshing the two shares of one or the at least one data words includes XOR combining the two shares with the same mask refresh word.

Example 24 is the data processing device of any one of Examples 1 to 23, wherein each data word is split into the at least two respective shares such that an XOR combination of the at least two shares gives the data word.

Example 25 is the data processing device of any one of Examples 1 to 24, wherein the output circuit is configured to store, depending on the control sequence, the at least two shares of the result data word in a memory word assigned to the result data word of the memory or to store the refreshed at least two shares in the memory word assigned to the result data word.

Example 26 is the data processing device of Example 25, wherein the memory word is the memory word storing the at least two shares processed and/or refreshed.

Example 27 is a method for processing data as illustrated in is FIG. 4.

Example 28 is the method of Example 27, including, for each operation of a sequence of operations, processing the at least two shares according to the operation to generate at least two shares of a result data word, refreshing the at least two shares and storing the at least two shares of the result data word or storing the refreshed at least two shares depending on the control sequence.

Example 29 is the method of Example 28, wherein at least some operations of the sequence of operations are non-dummy operations.

Example 30 is the method of Example 28 or 29, wherein the control sequence specifies, for each operation of the sequence of operations, whether a real operation or a dummy operation is to be carried out.

Example 31 is the method of Example 30, wherein the operations for which the control sequence specifies that a real operation is to be carried out are non-dummy operations.

Example 32 is the method of any one of Examples 28 to 31, including setting an order of the sequence of operations.

Example 33 is the method of Example 32, including setting the order of the sequence of operations based on one or more random numbers provided by a random number generator.

Example 34 is the method of any one of Examples 27 to 33, wherein the control sequence includes a control value for each operation of a sequence of operations and the method includes storing the at least two shares of the result data word or storing the refreshed at least two shares depending on the control value the control sequence includes for an operation according to which the logic circuit has processed the at least two shares.

Example 35 is the method of any one of Examples 27 to 34, including discarding the at least two shares of the result data word if the control sequence specifies for the operation that a dummy operation is to be carried out.

Example 36 is the method of any one of Examples 27 to 35, including discarding the refreshed at least two shares if the control sequence specifies for the operation that a real operation is to be carried out.

Example 37 is the method of any one of Examples 27 to 36, wherein the sequence of operations for which the control sequence specifies that a real operation is to be carried out implements a cryptographic processing of data represented by the plurality of data words.

Example 38 is the method of Example 37, wherein the cryptographic processing is a decryption, an encryption, a signing or a key generation.

Example 39 is the method of any one of Examples 27 to 38, including generating the control sequence based on one or more random numbers provided by a random number generator.

Example 40 is the method of any one of Examples 27 to 39, including refresh the at least two shares depending on a mask refresh value.

Example 41 is the method of any one of Examples 27 to 40, including performing the processing of the at least two shares depending on a mask refresh value.

Example 42 is the method of any one of Examples 27 to 41, including processing the at least two shares according to a non-dummy operation to generate the at least two shares of the result data word.

Example 43 is the method of any one of Examples 27 to 42, including processing the at least two shares to generate the at least two shares of the result data word according to an operation going beyond or differing from a remasking.

Example 44 is the method of any one of Examples 27 to 43, wherein the data includes secret data.

Example 45 is the method of any one of Examples 27 to 44, wherein the data includes one or more cryptographic keys.

Example 46 is the method of any one of Examples 27 to 45, including splitting each data word of the plurality of data words into at least two respective shares and storing the shares into the memory.

Example 47 is the method of any one of Examples 27 to 46, including storing the shares in a random-access memory, one or more processor registers, a non-volatile memory or a combination thereof.

Example 48 is the method of any one of Examples 27 to 47, including a multiplexer receiving one of the at least two shares of the result data word and receiving a refreshed share and outputting the share of the result data word or the refreshed share depending on the control sequence.

Example 49 is the method of any one of Examples 27 to 48, wherein the at least two shares are two shares and refreshing the two shares of one or the at least one data words includes XOR combining the two shares with the same mask refresh word.

Example 50 is the method of any one of Examples 27 to 49, wherein each data word is split into the at least two respective shares such that an XOR combination of the at least two shares gives the data word.

Example 51 is the method of any one of Examples 27 to 50, including storing, depending on the control sequence, the at least two shares of the result data word in a memory word assigned to the result data word of the memory or storing the refreshed at least two shares in the memory word assigned to the result data word.

Example 52 is the method of Example 51, wherein the memory word is the memory word storing the at least two shares processed and/or refreshed.

According to a further example, a processing device is provided including storing means for storing each data word of a plurality of data words in the form of at least two respective shares; processing means for processing the at least two shares of at least one of the data words to generate at least two shares of a result data word, refreshing means for refreshing the at least two shares of at least one of the data words and output means for storing the at least two shares of the result data word or storing the refreshed at least two shares depending on a control sequence specifying a sequence of real operations and dummy operations.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which are described herein may also be understood as a "circuit" in accordance with an alternative embodiment.

In particular, according to various embodiments, a "circuit" may be hard-wired circuit with a fixed functionality (i.e. configured to calculate a fixed Boolean function). For example, the remasking circuits may be implemented by an array of XOR gates.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data processing device comprising:
   a memory configured to store each data word of a plurality of data words in the form of at least two respective shares;
   a logic circuit configured to receive the at least two shares of at least one of the data words and to process the at least two shares to generate at least two shares of a result data word;
   a remasking circuit configured to receive the at least two shares of at least one of the data words and refresh the at least two shares; and
   an output circuit configured to selectively store one of (a) the at least two shares of the result data word and (b) the refreshed at least two shares, depending on a control sequence specifying a sequence of real operations and dummy operations.

2. The data processing device of claim 1, wherein:
   the logic circuit is configured to, for each operation of a sequence of operations, receive the at least two shares of at least one of the data words and process the at least two shares according to the operation to generate at least two shares of a result data word, the remasking circuit is configured to receive the at least two shares of at least one of the data words and refresh the at least two shares, and the output circuit is configured to selectively store one of (a) the at least two shares of the result data word and (b) the refreshed at least two shares, depending on the control sequence.

3. The data processing device of claim 2, wherein at least some operations of the sequence of operations are non-dummy operations.

4. The data processing device of claim 2, wherein the control sequence specifies, for each operation of the sequence of operations, whether a real operation or a dummy operation is to be carried out.

5. The data processing device of claim 4, wherein the operations for which the control sequence specifies that a real operation is to be carried out are non-dummy operations.

6. The data processing device of claim 2, comprising a control circuit configured to set an order of the sequence of operations.

7. The data processing device of claim 6, comprising a random number generator, wherein the control circuit is configured to set the order of the sequence of operations based on one or more random numbers provided by the random number generator.

8. The data processing device of claim 1, wherein the control sequence comprises a control value for each operation of a sequence of operations and the output circuit is configured to selectively store one of (a) the at least two shares of the result data word and (b) the refreshed at least two shares, depending on the control value the control sequence comprises for an operation according to which the logic circuit has processed the at least two shares.

9. The data processing device of claim 1, wherein the data processing device is configured to discard the at least two shares of the result data word if the control sequence specifies for the operation that a dummy operation is to be carried out.

10. The data processing device of claim 1, wherein the data processing device is configured to discard the refreshed at least two shares if the control sequence specifies for the operation that a real operation is to be carried out.

11. The data processing device of claim 1, wherein the sequence of operations for which the control sequence specifies that a real operation is to be carried out implements a cryptographic processing of data represented by the plurality of data words.

12. The data processing device of claim 11, wherein the cryptographic processing is a decryption, an encryption, a signing or a key generation.

13. The data processing device of claim 1, comprising a random number generator and a control sequence generation circuit configured to generate the control sequence based on one or more random numbers provided by the random number generator.

14. The data processing device of claim 1, wherein the remasking circuit is configured to receive a mask refresh value and is configured to refresh the at least two shares depending on the mask refresh value.

15. The data processing device of claim 1, wherein the logic circuit is configured to receive a mask refresh value and is configured to perform the processing of the at least two shares depending on the mask refresh value.

16. The data processing device of claim 1, wherein the logic circuit is configured to process the at least two shares according to a non-dummy operation to generate the at least two shares of the result data word.

17. The data processing device of claim 1, wherein the logic circuit is configured to process the at least two shares to generate the at least two shares of the result data word according to an operation going beyond or differing from a remasking.

18. The data processing device of claim 1, wherein the data comprises secret data.

19. The data processing device of claim 1, wherein the data comprises one or more cryptographic keys.

20. A method for processing data comprising:
storing each data word of a plurality of data words in the form of at least two respective shares;
processing the at least two shares of at least one of the data words to generate at least two shares of a result data word;
refreshing the at least two shares of at least one of the data words;
selectively storing one of (a) the at least two shares of the result data word and (b) the refreshed at least two shares, depending on a control sequence specifying a sequence of real operations and dummy operations.

* * * * *